WORCESTER & BROWN.
Fruit Jar Stopper.
No. 77,559.
Patented May 5, 1868.
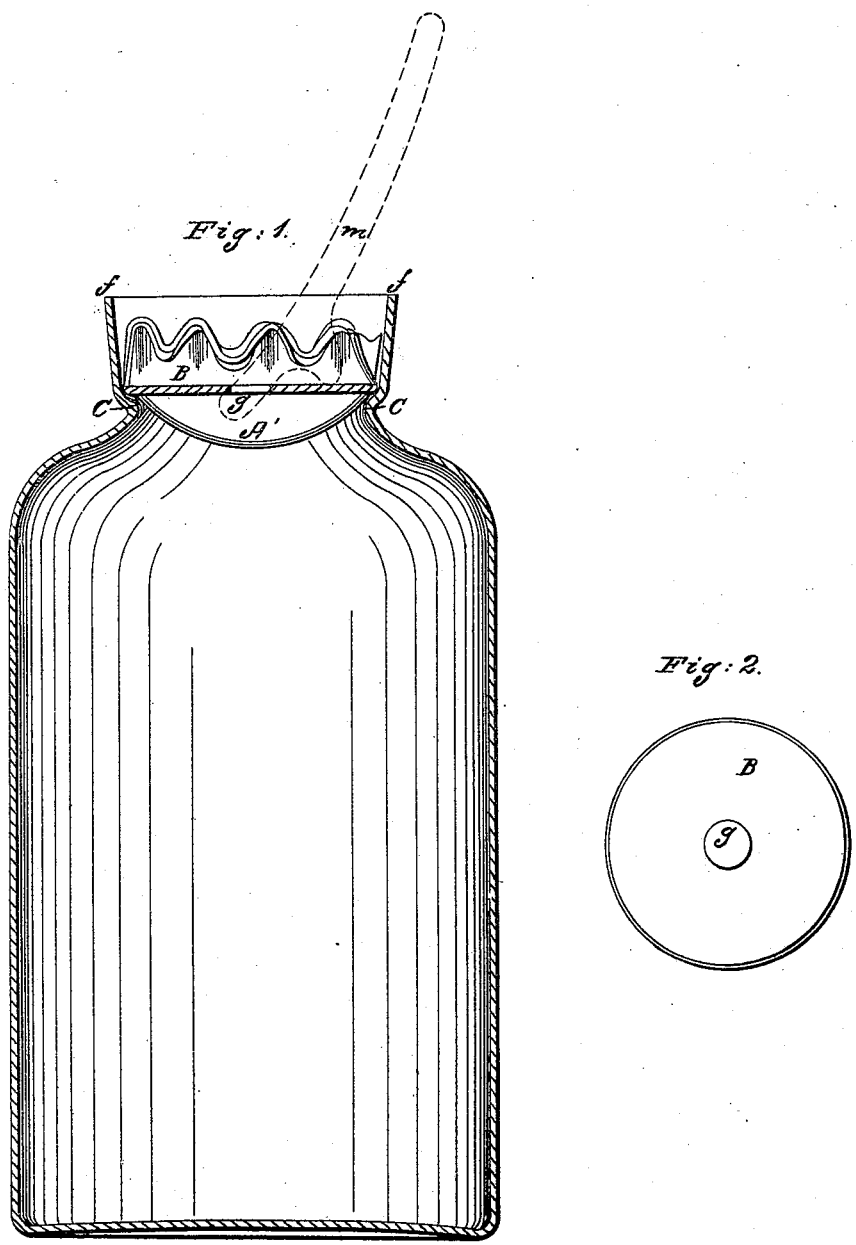

UNITED STATES PATENT OFFICE.

LEONARD WORCESTER AND JOSEPH S. BROWN, OF LOWELL, MASS.

IMPROVED FRUIT-JAR.

Specification forming part of Letters Patent No. 77,559, dated May 5, 1868.

*To all whom it may concern:*

Be it known that we, LEONARD WORCESTER and JOSEPH S. BROWN, both of Lowell, in the county of Middlesex and State of Massachusetts, have invented certain new and useful Improvements in Stoppers for Fruit-Jars, Fruit-Cans, or other Similar Articles, of which the following is a full, clear, and exact description, reference being had to the accompanying drawings, making part of this specification, in which—

Figure 1 represents a vertical central section of a fruit or preserve jar with our invention and improvements applied thereto. Fig. 2 is a plan of the perforated disk or washer pertaining to the same.

This invention consists of an elastic cover, A, in combination with a perforated disk or washer, B, which constitutes a stopper when applied to the interior of the opening or mouth of a fruit or preserve jar, in such a manner as to prevent atmospheric air entering the jar, or any substance within being forced out by ordinary pressure caused by the action of the common contents of the fruit-jar.

This invention has for its object to provide a cheap, simple, and durable stopper for fruit or preserve jars; a stopper that will not be liable to get broken or injured by ordinary use; a stopper that serves not only for that purpose, but also as a test or indicator by which it may be determined with certainty whether or not a jar of fruit has been hermetically sealed, or that the mouth of the jar has been so perfectly closed as to prevent any substance passing into the jar or being expelled therefrom.

In constructing our invention, the fruit jar may be made in any of the well-known forms, except that the mouth should be a little flaring and largest at the top, so that when the rubber or other elastic cover, A, and the disk or washer B are pressed down into the flaring mouth and onto the shoulder *c*, that portion of the elastic cover which is turned upward, and which encircles the outer edge of the disk or washer, is compressed between the outer edge of the latter and the inner surface of the flaring mouth, thus perfectly closing the mouth of the jar.

In the use of our invention and improvements, and in filling and stopping the mouth of the jar, the fruit or substance to be preserved is prepared and put in the jar, as usual, in a heated state, or heated after being put into the jar, and to the degree necessary to expel all, or nearly all, the atmospheric air from within, and while in this state the elastic cover is placed over and upon the top edge *f*, of the mouth or opening, and the disk or washer B is placed on the top of the elastic cover and pressed down, as before described. The jar or jars of fruit or other substances thus closed are allowed to cool before being put away or packed for transportation; and in order to determine if all such closed jars are properly closed so as to exclude atmosphere and prevent any part of the contents of any of such jars being expelled it is only necessary to look into or through the hole *g* in the disk or washer, when it will be observed that if the elastic cover A of any jar is up fair against the under side of such washer such jar has not been properly stopped, and in order to preserve its contents should be again subjected to the heating and stopping process and operation. If, on examination of any of the previously prepared and stopped or sealed jars, the elastic cover A is found drawn downward and inward, as shown in Fig. 1, it will be found that such jar is properly and perfectly sealed or closed, and that the substance within such perfectly-closed jar will be preserved, for the condition of the elastic cover shows that the contraction of the contents of the jar, in cooling, have drawn the elastic cover downward, and that no atmospheric air can enter the jar to relieve the pressure and allow the elastic cover to rise. The disk or washer is removed by a rod or a short lever, *m*, applied to the hole *g*, as shown in Fig. 1.

The advantages which are found in the use of our invention are cheapness, durability, easy to be applied, and easy of removal, serving as a test or indicator to determine at sight if the jar has been perfectly closed, and measurably to prevent the jars from being broken while stored or while in transit by changes in the atmosphere—that is, by heat or cold—for if the jars or the contents become heated, to expand them the elastic cover will yield or rise to the position it occupied when first applied to the jar, when the jar and its contents were in a heated state; and if the jar or jars are slowly or suddenly cooled, then the action of the elastic cover prevents injury to the jar by external pressure.

The disk or washer may be made of wood or any other hard and durable substance, and of glass, if preferred. The outer edge of the washer should be rounded or the corners removed, to prevent it cutting or injuring the elastic cover where it encircles the edge of the washer.

What we claim as new, and desire to secure by Letters Patent, is—

The elastic cover A and the perforated disk or washer B, applied to the mouth or opening of a fruit or preserve jar, in the manner and for the purpose substantially as described.

LEONARD WORCESTER.
    JOSEPH S. BROWN.

Witnesses:
 I. S. WHITNEY,
 JOHN E. CRANE.